Patented Jan. 28, 1936

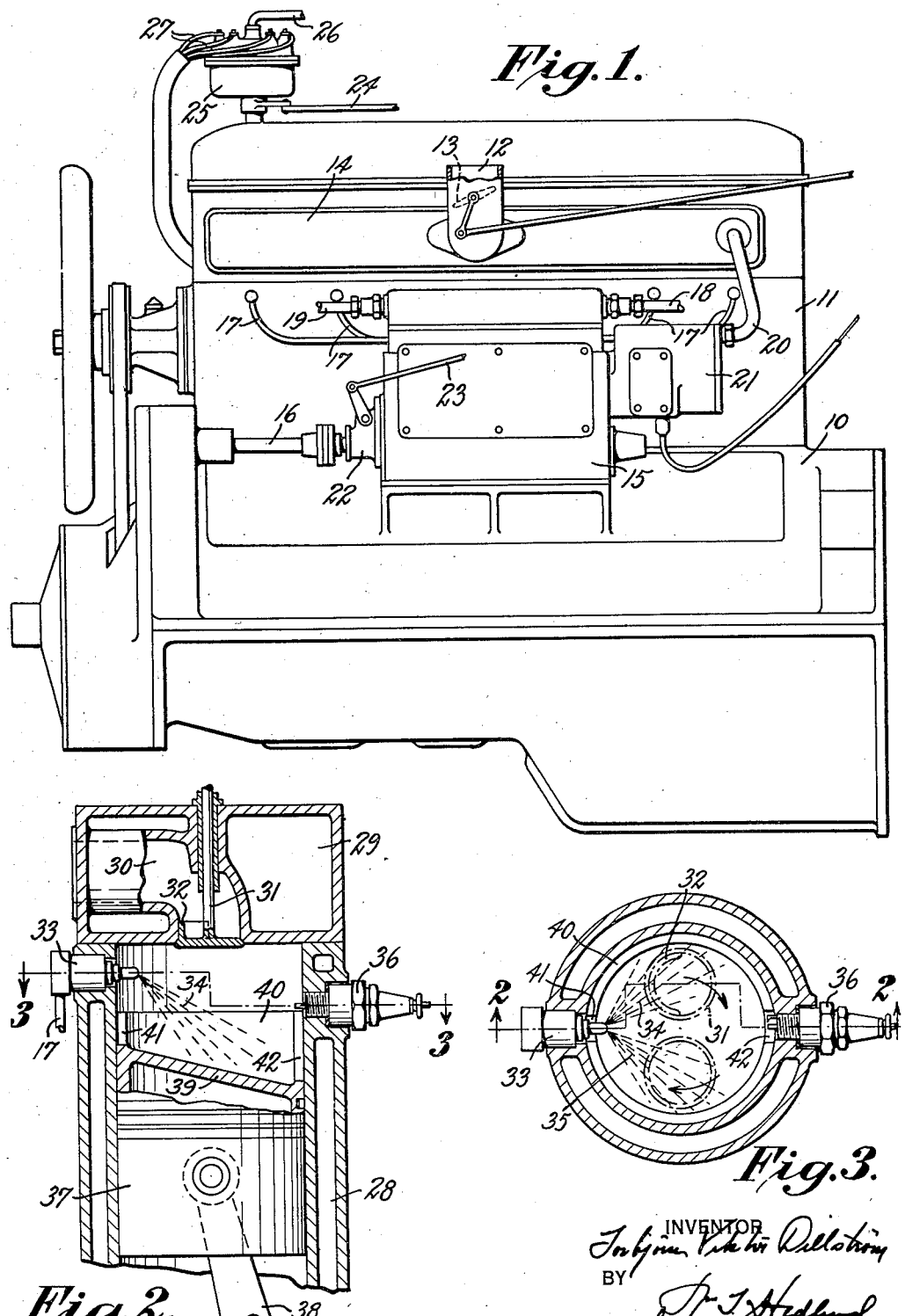

2,028,760

UNITED STATES PATENT OFFICE 2,028,760

INTERNAL COMBUSTION ENGINE

Torbjörn Viktor Diilström, Stockholm, Sweden, assignor to Hesselman Motor Corporation, Ltd., London, England, a corporation of Great Britain Application March 24, 1933, Serial No. 662,606
In Germany March 26, 1932

4 Claims. (Cl. 123—32)

The present invention relates to internal combustion engines and has particular reference to engines of the airless injection type. Still more particularly the invention relates to airless injection internal combustion engines of the low compression type having timed injection and ignition of the fuel charges. Still more particularly the invention relates to high speed explosion engines of the above described character in which the fuel charge is completely or substantially completely formed prior to the time of ignition.

In the operation of internal combustion engines of the airless injection type with timed ignition, in which air for combustion is compressed prior to ignition, the production of an ignitable mixture of fuel and air at the place of ignition and at the proper time is essential to satisfactory operation, and in order to insure proper ignition of the fuel charge even when the charge is very small, as for example when the engine is idling, injection of fuel and ignition thereof, in the case of known types of low compression engines, are effected by injecting finely divided fuel into the combustion chamber toward the end of the compression stroke and igniting a portion of the air in the combustion chamber which is impregnated with the injected fuel to provide an ignitable mixture of fuel and air at the place of ignition.

In this mode of operation with high speed engines, and particularly in the case of short stroke engines, difficulties may be encountered in prior forms of engines in obtaining the desired ignitable mixture of fuel and air at the place of ignition at the proper time when ignition should occur. In high speed engines the time of ignition should be advanced with increase of speed in order to obtain efficient operation with maximum power output from the engine and since the fuel mixture for any given charge should be completely or substantially completely formed before the time of ignition. Therefore means are to be provided for facilitating and accelerating the formation of the ignitable mixture at the place of ignition in due time.

Advance in the time of termination of injection by shortening the injection period through increase in the speed of injection is feasible only within comparatively narrow limits, since the greater the speed of the liquid column of fuel in the delivery pipe from fuel pump, the greater is the influence of inertia on the fuel injection process. The resistance to acceleration at the beginning of injection and the momentum of the moving column of fuel at the termination of injection both militate, to an increasing extent with increasing speed, against a shortening of the injection period. The timely completion of the charge, however, is most satisfactorily obtained by commencing the injection earlier in the cycle than in the case of slow speed, long stroke engines, or by accelerating as much as possible the formation of the fuel mixture to be exploded. In some cases, an early termination as well as a suitable acceleration may be used together for obtaining the best result.

In known types of engines in which fuel is introduced into the combustion chamber by airless injection and the resulting fuel mixture is ignited by timed igniting means, it has been found highly advantageous to provide the wall of the combustion chamber with a protective lining, at least at the place toward which the jet or jets of fuel are directed during the injection period. If the protective lining in prior types of engines is of the kind that is fixed in the cylinder, the lining provides comparatively little protection when injection of fuel occurs relatively early, since, during the time elapsing before the piston reaches the inner end of its stroke or before the fuel charge is ignited and burned, fuel which may have impinged upon the protective lining may run down the lining and reach the cylinder wall. This is, of course, to be avoided because of the adverse effects of mixture of the fuel oil with the lubricating oil on the cylinder wall. In cases where the protective lining is in the form of a flange or collar extending above the head of the piston, the ordinary symmetrical design of combustion chamber is not satisfactory for early injection, since in such types of design the lining provided by the flange or collar is not in proper position at the time of injection to prevent some of the injected fuel from impinging directly upon the cylinder wall. This condition is aggravated in the case of short stroke engines, since with such engines the clearance or compression chamber, if symmetrical, must be relatively shallow and the piston flange or collar must therefore be relatively low.

The present invention has for its general object the elimination of the difficulties heretofore encountered and the provision of an engine of the type under discussion in which the injection of fuel and the formation of an ignitable fuel mixture may be effected in such a manner that even in the case of high speed, short stroke engines, an ignitable mixture of fuel and air is provided at the place and proper time of ignition.

The nature of the invention and the manner other and more detailed objects of the invention are attained may best be understood from the following description of suitable forms of apparatus for carrying the invention into effect, taken in conjunction with the accompanying drawings forming a part of this specification.

In the drawings:

Fig. 1 is a side elevation of one form of internal combustion engine of the type to which the invention relates;

Fig. 2 is a vertical section of the combustion chamber end of an engine cylinder embodying the invention, taken on the line 2—2 of Fig. 3;

Fig. 3 is a transverse section taken on the line 3—3 of Fig. 2;

Figure 4:
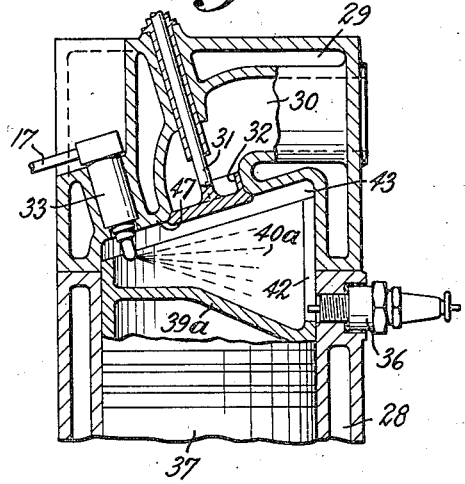
Fig. 4 is a view similar to Fig. 2 showing another form of combustion chamber.

Turning now more particularly to Fig. 1, the engine illustrated, and indicated generally at 10, is of the six cylinder vertical in-line automotive type, although it is to be understood that the invention is applicable to engines having different numbers and arrangements of cylinders. The cylinder block is indicated generally at 11 and air for combustion is admitted through the intake 12 controlled by throttle 13 and is distributed to the inlet passages of the individual cylinders through the manifold 14.

Fuel is supplied to the cylinders in timed relation with respect to the engine cycle by means of a multiple fuel pump unit 15 of known type driven by means of shaft 16 suitably geared to the engine crank shaft. The fuel pump unit, the details of which per se form no part of the present invention, contains a plurality of plunger pumps which deliver fuel to the injection nozzles of the several cylinders through the delivery pipes 17. Fuel is supplied to the pump unit through the conduit 18 and excess fuel is returned to the supply tank through conduit 19. In the example illustrated, control of the amount of fuel supplied to each cylinder per working stroke is effected in known manner in response to variations in the pressure in the intake manifold as determined by the speed of operation of the engine and the position of the throttle 13. For this purpose the intake manifold is connected by means of conduit 20 with suitable pressure-responsive mechanism in the casing 21, which mechanism operates to vary the effective stroke of the pumps under the influence of variations in inlet manifold pressure.

In order to suitably control the time of injection with relation to the engine cycle, a coupling 22 is provided between shaft 16 and the pump shaft. This coupling is of known type and in response to manipulation of the control rod 23 the coupling operates to move the pump shaft rotationally with respect to shaft 16 so as to advance or retard the time of injection with respect to the engine cycle.

Ignition is timed with respect to the engine cycle and in the embodiment illustrated ignition is effected by a high tension electrical ignition system of known type employing spark plugs in the several cylinders. Proper timing of the ignition and the advance and retardation of the spark with respect to the engine cycle is effected in the usual manner through the movement, by means of the control rod 24, of the usual distributor head 25 within which is the distributing rotor suitably geared to the crank shaft or other driven shaft of the engine. High tension current is supplied to the distributor head through cable 26, and this current is conducted to the spark plugs at properly timed intervals through the ignition cables 27 connecting the distributor head with the several spark plugs.

The above described fuel injecting and igniting means are well known in the art and are therefore not described herein in detail. It will be appreciated that within the scope of the present invention other forms of fuel injecting and igniting apparatus may be employed to secure the desired timed injection of fuel and timed ignition of the fuel charge.

Turning now to Figs. 2 and 3, the engine cylinder comprises a barrel portion 28 and a separate cylinder head portion 29. Both the barrel portion and cylinder head portion are jacketed for cooling water in the usual manner and while shown separate in the present embodiment, it will be evident that the cylinder may be of the type in which the head portion is integral with the barrel portion. As hereinafter employed, the term cylinder is to be considered as including cylinders with either separate or integral head portions.

The cylinder illustrated is of the overhead valve type and air for combustion is admitted through passage 30 communicating with manifold 13. Admission of air to the combustion chamber of the cylinder is controlled by means of the inlet valve 31, actuated by the usual push rod and rocker arm or overhead cam shaft (not shown) and the valve head is provided with a semi-circular skirt 32 which imparts to the air entering the cylinder on the suction stroke of the piston a rotary motion in the direction indicated by the arrows in Fig. 3.

The fuel injection nozzle 33, seated in the side wall of the cylinder, injects finely divided fuel into the cylinder in two divergent sprays or jets 34 and 35. The number of jets or sprays may be varied. Any suitable specific construction of injection nozzle may be employed.

The spark plug 36 for effecting ignition is seated in the side wall of the cylinder opposite the injection nozzle 33.

The piston 37 attached to connecting rod 38 is provided with a transversely inclined head or crown 39 above which projects the peripheral flange or collar 40. It will be seen that the piston and cylinder provide a generally cylindrical combustion chamber coaxial with the axis of the cylinder and having a relatively shallow portion at one side of the cylinder and a relatively deep portion at the other side of the cylinder when the piston is at the inner end of its stroke. In the position shown in Fig. 2 the piston is substantially below top or inner dead center position on its compression stroke and the piston is enabled to move to the inner end of its stroke without interference of the flange 40 with the injection nozzle or the spark plug because of the vertical slots 41 and 42, into which slots the injection nozzle and the inner portion of the spark plug pass as the piston moves inwardly from the position shown to complete the compression stroke. When the piston is at the inner end of its stroke, the flange or collar 40 provides a protective lining for the side walls of the combustion chamber, and as will be observed more particularly from Fig. 2, it is possible for injection to be commenced relatively early in the compression stroke without danger of impingement of fuel against the unprotected side of the combustion chamber because of the relatively great depth of the flange serving as a protective lining for the deeper portion of the combustion chamber toward the wall of which the fuel is injected.

By suitably timing the injection of fuel, having in mind the movement of air in the cylinder during the compression stroke, it is possible under light engine loads to inject fuel so as to impregnate a portion or portions of the total air charge with fuel and have the movement of the air in the cylinder carry one of such portions to the vicinity of the spark plug or other ignition device at the time when ignition occurs. Under heavy engine loads the length of the period of injection is increased and larger portions of the air in the cylinder are impregnated with fuel so that as the load on the engine increases, the proportion of fuel impregnated air in the combustion chamber at the time of ignition increases.

In the embodiment illustrated, the piston flange 40 not only serves to protect the cylinder wall against direct impingement of fuel from the nozzle jet or jets, but also provides, through the medium of the slot 42 a means for protecting the spark plug against direct impingement of liquid fuel which may impinge upon the flange 40 and travel peripherally along this flange. It is to be noted from Fig. 3 that the fuel is not injected directly toward the spark plug, but toward a portion of the flange to one side of the plug. This arrangement prevents fouling of the plug due to wetting by direct impingement thereon of unatomized liquid fuel or fuel condensed by contact with the relatively cool surfaces such as the insulating surfaces of the plug.

The combustion chamber formed by the apparatus just described may be said to be in the form of an obliquely truncated cylinder having a cavity, which may be termed an ignition cavity, having end walls angularly placed with respect to each other and having end wall portions angularly divergent outwardly from the axis of the cylinder toward the deeper portion of the combustion chamber. This arrangement permits the employment of a relatively deep protective lining in the portion of the combustion chamber where the combustible mixture is formed under all load conditions on the engine and in the vicinity of the ignition means, while at the same time permitting a clearance or compression space of sufficiently small cubic capacity to enable a proper compression ratio to be obtained even with an engine having a comparatively short stroke as compared with the cylinder bore.

In order to form the ignitable charge as rapidly and efficiently as possible, it is advantageous to employ a nozzle projecting a jet the vertical dispersion of which approximates the depth of the protective lining at the place toward which the jet is directed, which place is preferably in the deeper portion of the combustion chamber. With a combustion chamber formed in the manner illustrated in Fig. 2 and with the fuel jets directed into the combustion chamber in the manner illustrated, it is possible to commence injection, even in a short stroke engine, as early as the third quarter of the compression stroke. From this it will be evident that ample time is available for completing or substantially completing injection of fuel before ignition occurs, even though the time of ignition is advanced well ahead of top dead center position of the piston, as is the case with engines operating at high speed.

In Fig. 4 the combustion chamber is formed partially in the head portion of the cylinder and extends partially into the barrel portion of the cylinder. In this embodiment the head portion is recessed at 43 and provides a transversely inclined end wall 47 in which the cylinder valves seat. As in the form shown in Fig. 2, the inlet valve 31, skirted at 32, controls the admission of air through the inlet passage 30 and imparts rotary motion to the air introduced into the combustion chamber. The spark plug, as in the form shown in Fig. 2, is situated in the side of the barrel portion of the cylinder. The injection nozzle is seated in the cylinder head portion, but as in the form shown in Fig. 2, projects the fuel jets generally transversely of the cylinder. In this form the piston 37 is provided with a transversely inclined head or crown portion 39a, the remaining portion of the crown being normal to the axis of the cylinder. As in the form previously described, the piston is provided with a peripheral flange 40a slotted at 42 to permit the flange to pass the plug 36 and to provide an ignition cavity for the plug. The upper edge of the flange 40a lies in an inclined plane preferably parallel to the plane of the upper or inner end wall of the combustion chamber formed in the head portion of the cylinder.

It will be evident from the figure that this construction provides, in substantially the same manner as that provided by the construction shown in Fig. 2, a combustion chamber having a relatively deep portion at one side of the cylinder, in which portion the ignition device is located, and having a relatively shallow portion at the opposite side of the cylinder whereby the small volume of the compression space necessary to obtain a satisfactory compression ratio may be obtained. By the arrangement illustrated in this embodiment it will be evident that fuel may be injected into the combustion chamber by means of a jet having comparatively wide dispersion in vertical plane without there being danger of projecting liquid fuel against an unprotected cylinder wall surface. Because of the wide jet that may be employed, the time necessary to inject a charge of fuel into the cylinder may be made relatively short without having to resort to increase in the speed of injection, and consequently commencement of injection of fuel to the cylinder need not be so early in the compression stroke. In other words, because of the relatively wide jet that may be employed and the consequently rapid formation of the combustible fuel mixture, injection may be completed before the time of a well advanced spark without its being necessary to resort to extremely early commencement of injection.

In both of the embodiments shown in Figs. 2 and 4 it will be noted that the depth of the combustion chamber at the side where the ignition device is located is sufficiently great so that the ignition device is located to one side of the crown of the piston when the piston is at the inner end of its stroke rather than above the piston. This arrangement enables a portion at least of the piston crown to pass the level of the ignition device on the inward stroke of the piston to provide, at the end of the stroke, a clearance or compression space of comparatively small volume.

Figure 5:
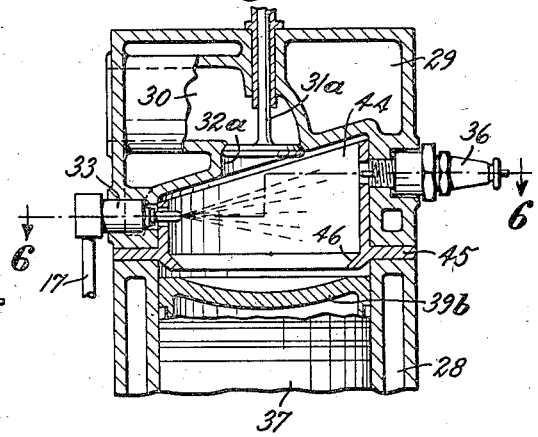
Fig. 5 is a view similar to Fig. 2 showing still another form of combustion chamber.
Figure 6:
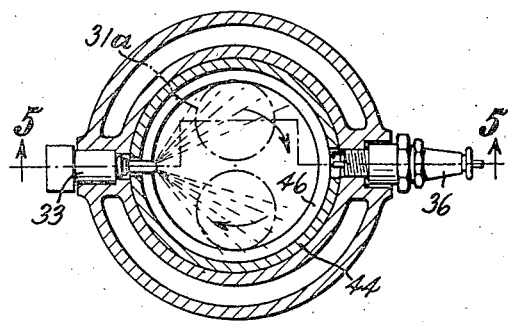
Fig. 6 is a section taken on the line 6—6 of Fig. 5.

Turning now to Fig. 5, a cylinder arrangement is shown in which a stationary protective lining is employed for the side walls of the combustion chamber. In this arrangement the combustion chamber is formed substantially wholly in the head portion of the cylinder and the upper or inner end of the combustion chamber is transversely inclined as in the arrangement shown in Fig. 4. This combustion space is protected by a sleeve-like lining 44 having an outwardly extending flange portion 45 adapted to be secured between the head and barrel portions of the cylinder. Preferably, the lower portion of the sleeve 44 is inwardly inclined as at 46 and the piston 37 is symmetrical with respect to the axis of the cylinder, being shown as having a slightly dished head or crown 39b.

Air is admitted to the combustion chamber through the channel 30 and valve 31a, the head of which is not provided with a skirt as in the previously described forms. In the present arrangement the valve head is angularly disposed with respect to the inner end wall of the combustion chamber and rotary motion is imparted to the incoming air due to the presence of the portion 32a of the inlet passage which functions in the same manner as the semi-circular skirt 32 on the valve in Fig. 2.

The sleeve 44 is provided with suitable openings through which projects the injection nozzle 33 and the spark plug 36, the opening in the sleeve which registers with the spark plug opening in the cylinder head serving to provide protection of the plug against direct impingement of liquid fuel.

In this arrangement, as in the arrangement illustrated in Fig. 4, fuel may be injected into the cylinder in a comparatively broad jet without impingement of fuel upon any of the cooled cylinder wall surface and consequently the formation of the fuel charge may be effected rapidly and may be completed without resorting to early commencement of injection. In the cavity provided at the place of the igniter 36 ignitable mixture will be present during the end of the compression stroke so that the igniter is wrapped in a cloud of mixture at the time of ignition. These facts, coupled with the considerable depth of the protective lining at the point where fuel impinges, substantially eliminate the possibility of unvaporized fuel impinging upon and flowing downwardly from the protecting lining before ignition occurs. If desired, the possibility of fuel dripping from the protective lining to the cylinder wall may be further guarded against by the employment of the inturned flanged portion 46 from which any fuel would fall upon the crown of the piston rather than flow onto the cylinder wall.

Figure 7:
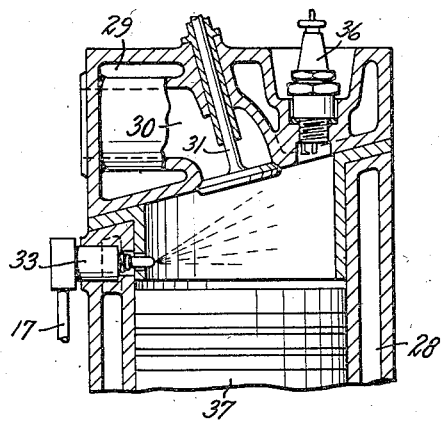
Fig. 7 is a view similar to Fig. 2 showing still another form of combustion chamber.

Fig. 7 illustrates an arrangement similar to that shown in Fig. 5 in that a fixed or stationary protective lining is employed. In the present embodiment the barrel portion of the cylinder and the cylinder head portion join along an inclined transverse plane and the combustion chamber is formed by a clearance space in the barrel portion of the cylinder between the cylinder head and the top of the piston at the inner end of its stroke.

The spark plug is located in the cylinder head and at the side of the cylinder where the combustion chamber is of greater depth. From the figure it will be evident that the comparatively great extent of the protective lining on the side of the cylinder where the spark plug is located permits injection of fuel with relatively wide dispersion and consequently permits relatively rapid formation of the fuel charge. Thus, as in the form shown in Fig. 5, injection may be completed ahead of the time of a well advanced spark without resorting to advance of the time of commencement of injection. It will be apparent that upward movement of the piston on its compression stroke will provide a certain movement of air in the cylinder in an upward direction during this stroke, and this upward movement of the air may be depended upon to carry combustible fuel charge into the ignition cavity in which the plug is located.

In all of the several embodiments it will be understood that the formation of a combustible charge at part loads on the engine contemplates the impregnation with fuel of only a part of the combustion air in the chamber so that even with a small amount of fuel injected, a mixture of air and fuel of sufficient fuel density is provided at the place of ignition and at the time of ignition to insure reliable firing of the charge. If injection of fuel is started at a very early time in the compression stroke, that is, for example, in the first quarter or even the second quarter of the stroke, sufficient time will elapse between the time of injection and the time of ignition to cause diffusion of a small fuel charge in the air in the chamber to an extent resulting in an extremely lean mixture the reliable ignition of which cannot be counted upon, and consequently relatively early injection of fuel as considered herein is to be considered as relatively early with respect to the time of injection in engines in which the fuel charge is formed and ignited in the general manner contemplated by the present invention and not with respect to other types of engines in which at part load the fuel charge may be diffused throughout the contents of the combustion chamber prior to the time of ignition. In this connection, it is to be noted that the term low compression as herein employed is to be considered as compression sufficiently low so that ignition is not effected by the heat due to compression.

While in the several embodiments which have been hereinbefore described by way of example, the cylinders illustrated are of such small bore that the valves are relatively close together and thus make impractical the location of the injection nozzle at the center of the cylinder head, it will be apparent that in the case of larger cylinders where space permits the injection nozzle may be placed coaxially with the cylinder and the jet or jets of fuel projected into the cylinder radially rather than in the manner shown in the illustrative forms. In case of radial injection of fuel from the center of the cylinder, the ignition device would be placed, as in the illustrative forms, at the side of the cylinder where the combustion chamber is of greater depth.

It will be obvious to those skilled in the art that the invention is not limited to the specific forms of apparatus herein disclosed by way of example, and it is to be understood that the invention embraces all such changes and modifications as may fall within the scope of the appended claims when construed as broadly as is consistent with the state of the prior art.

What I claim is:

1. In an electrically ignited injection engine of the explosion type in which substantially all of the fuel for a given charge is injected prior to the time of ignition thereof to thereby substantially completely form the charge prior to ignition and in which the time of ignition is normally in advance of top dead center, cylinder and piston parts forming a generally cylindrical combustion chamber having a relatively deep portion at one side of the cylinder and a relatively shallow portion at the opposite side of the cylinder to compensate for the added combustion chamber volume resulting from said deeper portion and to thereby provide a suitable compression ratio, an upstanding peripheral flange on said piston forming the side wall of the deeper portion of said chamber when the piston is at top dead center, a timed ignition device providing a point of ignition in the deeper portion of said chamber, and a timed injection device located so as to provide a combustible fuel mixture in said relatively deep portion at the time of ignition.

2. In an electrically ignited injection engine of the explosion type in which substantially all of the fuel for a given charge is injected prior to the time of ignition thereof to thereby substantially completely form the charge prior to ignition and in which the time of ignition is normally in advance of top dead center, a cylinder and a piston forming a generally cylindrical combustion chamber, said piston having a transversely inclined crown whereby to provide a relatively deep portion at one side of the cylinder and a relatively shallow portion at the opposite side of the cylinder to compensate for the added combustion chamber volume resulting from said deeper portion and to thereby provide a suitable compression ratio, an upstanding peripheral flange on said piston forming the side wall of the deeper portion of said chamber when the piston is at top dead center, a timed ignition device providing a point of ignition in the deeper portion of said chamber, and a timed fuel injecting device located in the shallow portion of said chamber for injecting fuel transversely across said combustion chamber toward said deeper portion so as to provide a combustible fuel mixture in the deeper portion at the time of ignition.

3. In an electrically ignited injection engine of the explosion type in which substantially all of the fuel for a given charge is injected prior to the time of ignition thereof to thereby substantially completely form the charge prior to ignition and in which the time of ignition is normally in advance of top dead center, a cylinder and a piston forming a generally cylindrical combustion chamber, said piston having a transversely inclined crown whereby to provide a relatively deep portion at one side of the cylinder and a relatively shallow portion at the opposite side of the cylinder to compensate for the added combustion chamber volume resulting from said deeper portion and to thereby provide a suitable compression ratio, an upstanding peripheral flange on said piston forming the side wall of the deeper portion of said chamber when the piston is at top dead center, a spark plug providing a point of ignition in the deeper portion of said chamber, and an injection nozzle located in the shallow portion of said chamber for injecting one or more jets of fuel toward the deeper portion of said chamber along chords of the cylinder prior to the time of ignition, whereby to provide a combustible fuel mixture in the deeper portion of said chamber at the time of ignition, said upstanding flange providing a shield protecting the portion of the cylinder wall toward which the fuel is injected.

4. In an electrically ignited injection engine of the explosion type in which substantially all of the fuel for a given charge is injected prior to the time of ignition thereof to thereby substantially completely form the charge prior to ignition and in which the time of ignition is normally in advance of top dead center, a cylinder and a piston forming a generally cylindrical combustion chamber, said piston having a transversely inclined crown whereby to provide a relatively deep portion at one side of the cylinder and a relatively shallow portion at the opposite side of the cylinder to compensate for the added combustion chamber volume resulting from said deeper portion and to thereby provide a suitable compression ratio, an upstanding peripheral flange on said piston forming the side wall of the deeper portion of said chamber when the piston is at top dead center, a spark plug providing a point of ignition in the deeper portion of said chamber and timed to provide ignition ahead of top dead center, a fuel injection nozzle located in the shallow portion of said chamber for injecting fuel along one or more chords of the cylinder toward the deeper portion of said chamber prior to the time of ignition so as to provide a combustible fuel mixture in the deeper portion at the time of ignition, said upstanding flange providing a shield for protecting the cylinder wall against impingement of fuel thereon during the relatively early period of injection which occurs before the piston reaches top dead center.

TORBJÖRN VIKTOR DILLSTRÖM.